US012346800B2

(12) United States Patent
Amad (10) Patent No.: US 12,346,800 B2
(45) Date of Patent: Jul. 1, 2025

(54) META-FEATURE TRAINING MODELS FOR MACHINE LEARNING ALGORITHMS

(71) Applicant: Ford Global Technologies, LLC, Dearborn, MI (US)

(72) Inventor: Hassan Fayez Amad, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 751 days.

(21) Appl. No.: 17/028,201

(22) Filed: Sep. 22, 2020

(65) Prior Publication Data

US 2022/0092406 A1 Mar. 24, 2022

(51) Int. Cl.
*G06N 3/08* (2023.01)

(52) U.S. Cl.
CPC ........................................ *G06N 3/08* (2013.01)

(58) Field of Classification Search
CPC ........................................................ G06N 3/08
See application file for complete search history.

(56) References Cited

U.S. PATENT DOCUMENTS

| 6,678,882 | B1 | 1/2004 | Hurley et al. | |
|---|---|---|---|---|
| 6,842,751 | B1 | 1/2005 | Vilalta et al. | |
| 8,364,613 | B1* | 1/2013 | Lin | G06N 7/01 700/65 |
| 8,370,280 | B1* | 2/2013 | Lin | G06N 5/04 706/12 |
| 11,423,072 | B1* | 8/2022 | Chen | G06F 18/253 |
| 11,620,558 | B1* | 4/2023 | Xu | G06N 7/01 706/12 |
| 2010/0153473 | A1 | 6/2010 | Gopalan | |
| 2018/0373953 | A1* | 12/2018 | Tomotaki | G06T 7/0002 |
| 2019/0303795 | A1* | 10/2019 | Khiari | G06N 5/01 |
| 2020/0151591 | A1* | 5/2020 | Li | G06N 3/08 |
| 2020/0234357 | A1* | 7/2020 | Price | G06Q 30/0631 |
| 2020/0380378 | A1* | 12/2020 | Moharrer | G06N 5/022 |
| 2021/0192368 | A1* | 6/2021 | Schall | G06N 20/00 |
| 2021/0326717 | A1* | 10/2021 | Mueller | G06N 20/00 |
| 2022/0036134 | A1* | 2/2022 | Bali | G06N 20/00 |
| 2022/0036250 | A1* | 2/2022 | Wang | G06N 20/20 |

(Continued)

OTHER PUBLICATIONS

Sikora et al. ("A Modified Stacking Ensemble Machine Learning Algorithm Using Genetic Algorithms", 2014) (Year: 2014).*

(Continued)

*Primary Examiner* — Jason B Dunham
*Assistant Examiner* — Huma Waseem
(74) *Attorney, Agent, or Firm* — Christopher Storms; Kilpatrick Townsend & Stockton LLP (57) ABSTRACT

A system and method are described herein for training and evaluating machine learning models trained using large complex datasets in an efficient manner. The systems enable methods for training a first model and generating predictions using the first trained model. The predictions and a portion of the data may be used to train a second model and generate predictions as an output of the second model. The first model may be used on a third dataset to generate predictions, which are appended to the third dataset. The appended third dataset is then input into the second model for generation of additional outputs that are compared against the third dataset for accuracy.

20 Claims, 6 Drawing Sheets

(56) References Cited

U.S. PATENT DOCUMENTS

2022/0059221 A1\* 2/2022 Zhu .................. G16H 30/40
2023/0061517 A1\* 3/2023 Yang ................ G06V 20/80

OTHER PUBLICATIONS

Todorovski, et al. "Combining Multiple Models with Meta Decision Trees", DOI: 10.1007/3-540-45372-5_6, Jan. 2000, 11 pages.
De Sousa, et al. "Decision Making Planning: The Meta-decision Approach", DOI: 10.5539/emr.v3n1p41, accepted Mar. 12, 2014, 15 pages.
Cruz, et al. "META-DES.Oracle: Meta-learning and feature selection for dynamic ensemble selection", https://doi.org/10.1016/j.inffus.2017.02.010, accepted Feb. 17, 2017, 20 pages.

\* cited by examiner

META-FEATURE TRAINING MODELS FOR MACHINE LEARNING ALGORITHMS

BACKGROUND

Data analytics and modeling problems using machine learning are becoming popular and often rely on data science expertise to build reasonably accurate machine learning (ML) models. Such modeling involves picking an appropriate model and training the model to a given dataset. Model training is the most time consuming and ad-hoc step when generating a machine learning model that heavily relies on data scientists. Typically, a model is trained on a training dataset, particularly on data features of the dataset. A portion of the dataset is reserved for validating and testing the model after training.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for developing and training a neural network, the method including training a first model using a first dataset. The method also includes generating a first prediction for each of a plurality of first data using the first model. The method also includes storing the first prediction for each of the plurality of first data with the first data in a second dataset. The method also includes training a second model using the second dataset. The method also includes generating a second prediction for each of a plurality of second data using the first model. The method also includes storing the second prediction for each of the plurality of second data with the second data in a third dataset. The method also includes generating a final prediction for each item in the third dataset. Other embodiments of this aspect include corresponding computer systems, apparatus, and computer programs recorded on one or more computer storage devices, each configured to perform the actions of the methods.

Implementations may include one or more of the following features. The method further including splitting a complete dataset into the first dataset, the plurality of first data, and the plurality of second data. The method where splitting the complete dataset includes randomly dividing the complete dataset into equal groupings for the first dataset, the plurality of first data, and the plurality of second data. The method where the first model and the second model are different types of models. The method where the first model and the second model are a same type of model with different parameters. The method where the first dataset, the plurality of first data, and the plurality of second data are each the same size. The method where the first dataset is a different size than at least one or the plurality of first data or the plurality of second data. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Training of models for machine-learning algorithms can be time consuming and must be checked for accuracy following training. It can be difficult to efficiently and accurately train models. In addition, large datasets, or datasets including several or many dimensions may be difficult to use for training of models.

In order to provide efficient and accurate training of models, the systems and methods provided herein can enable divide a dataset into multiple subsets. A first set of the subsets can be used to train a preliminary model. A second set of the subsets can be used by the preliminary model to a make a prediction on the same features the preliminary model was trained on from the first subset. The prediction may be a classification or may be a set of probabilities for the final classifications desired by the final model. The first prediction, output by the preliminary model may be used to train the final model. The final model may use the predictions and training labels of the second dataset for training. The final model may then generate a prediction, which is more accurate than the predictions from the first model. Following training, as described above, the preliminary model and final model may be used to generate more accurate predictions as well as an accuracy score for the output of the final model as described below.

After the final model is trained, the preliminary model is used to generate a first set of predictions using a third subset of the dataset. The predictions from the preliminary model are added to the third subset of data and are used along with the additional training features by the final model to generate a final prediction. The final prediction is compared to the actual value from the third subset to arrive at an accuracy score for the output of the final model. The preliminary model and the final model are each different in at least one way. The difference between the preliminary model and the final model may be a difference in parameters, in some examples the two models may be entirely different.

The systems and methods described herein provide for efficient training of machine learning algorithms and provides an accuracy rating for trained machine learning models. Additionally, the systems and methods herein are effective for processing data, especially text data that may be combined or mixed with non-text features. In conventional systems, a text and non-text feature would have to be built into a single matrix that can be used to train a model. The algorithm that will be trained may not be able to balance the text and non-text features of the dataset due to the single matrix required to train the model. By splitting the data into subsets, text and non-text features of the dataset can be used for training of the algorithm in a manner that balances both the text and non-text features of the dataset.

Additionally, the systems and methods described herein provide for greater accuracy for trained machine learning models by processing the data through two separately trained models, with the output of the first model used as a "first pass" on the data to enable the second model to provide a prediction with greater accuracy. The use of multiple machine learning models ensure greater accuracy of the final outputs of the model. Additionally, the systems and methods herein provide for processing large amounts of text and non-text data by lowering the dimensionality of text data without reducing features of the data to train the various models. Further still, the systems and methods described herein provide an increased ability to train models on text data mixed with non-text features by splitting the data as described herein.

As required, detailed embodiments are disclosed herein; however, it is to be understood that the disclosed embodiments are merely representative and the claimed subject matter may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
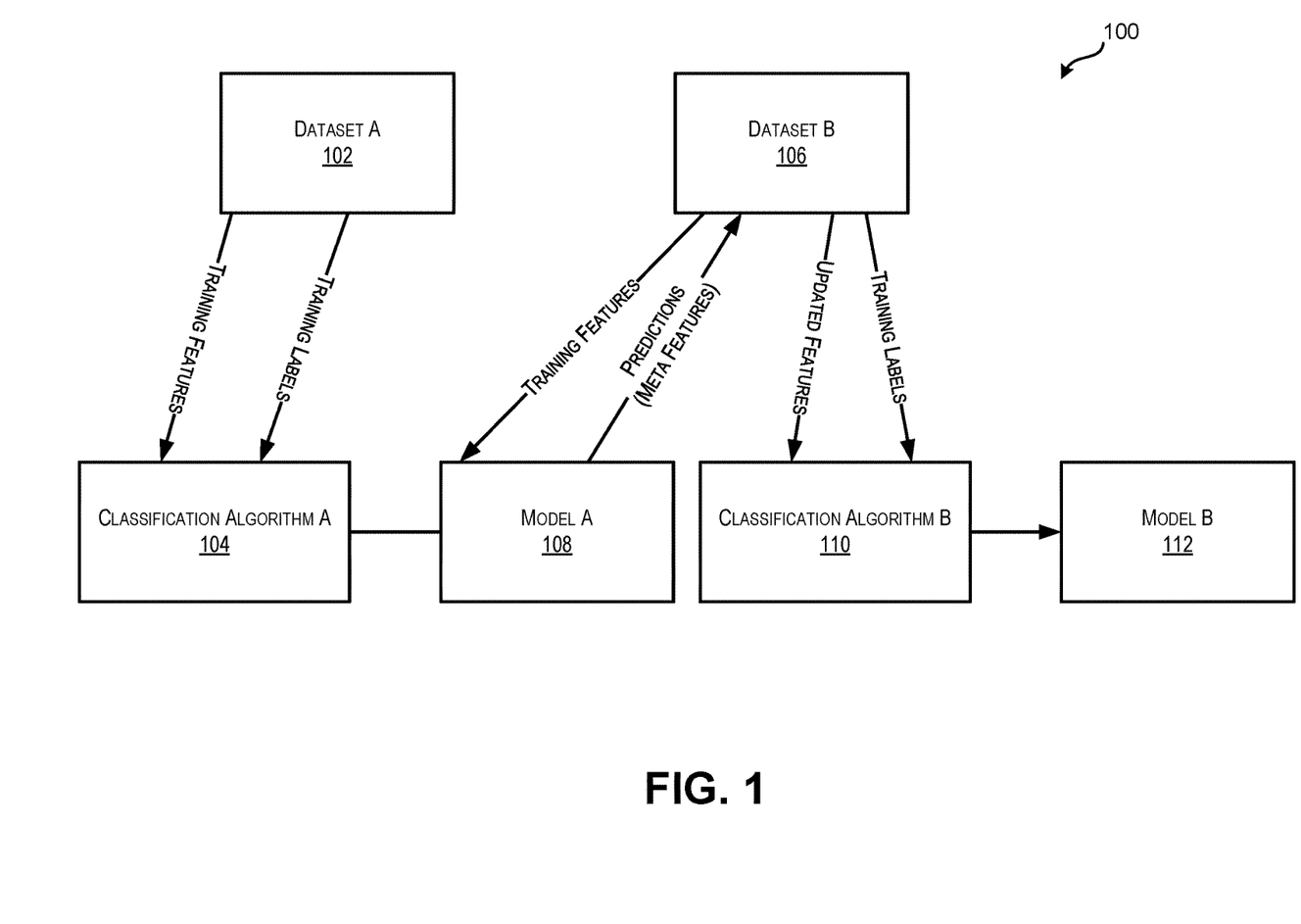
FIG. 1 illustrates a block diagram showing a method of training a model based on predictions from a first model, according to some embodiments.

Turning now to FIG. 1 that illustrates a block diagram 100 showing a method of training a model based on predictions from a first model, according to some embodiments. Initially, a first dataset is divided into dataset A 102, dataset B 106, and dataset C 204 (shown in FIG. 2). The division of the first dataset into the subsets may be random or may be divided according to the contents of the dataset. For example, dataset A may correspond to text data while dataset B 106 is non-text data. In some examples, each of the datasets may include similar data, such as similar types of data for different data entries. The first dataset may be divided into equal sized datasets or may be divided randomly and unequally. The first dataset can be split any number of ways and into as many different parts as can be conceived. In some embodiments, the number of divisions of the first dataset may be a variable that is modifiable by the system to produce more accurate results, for example by tuning the number of divisions of data to ensure each dataset has sufficient data to produce meaningful results without requiring extraneous data for training of the models.

Dataset A 102 is used in conventional training of classification algorithm A 104 to generate model A 108. Model A is therefore a conventionally trained machine learning model, according to known training methods. The training features and training labels of dataset A 102 are used for the training of classification algorithm A. Though the figures are shown with classification algorithms, other types of algorithms may be implemented, such as probability or other such known algorithm types. In some examples, model A may be a prediction of probability or confidence in a given outcome while model B 112 is a classification algorithm. Other such arrangements and embodiments are envisioned by the disclosure herein.

Once model A 108 is trained, dataset B 106 is input into the model to generate predictions. The training features of dataset B go into model A 108, after training, and the predictions are the outputs of model A 108. The predictions from model A 108 can be used with the training labels from dataset B 106 to train classification algorithm B 110 to generate the trained model B 112. The predictions and data of dataset B 106 comprise the updated features used to train classification algorithm B 110.

In the arrangement described above, model A 108 is a transformation, used for extraction of features from the dataset. Deploying model A 108 as a transformation with outputs provided to model B 112 enables model B 112 to use the predictions as part of the features set (updated features) to make predictions with model B. Due to this arrangement, model A 108 and model B 112 are different in at least one way. The models may differ with respect to structure or with respect to parameters, or may be entirely different models. Model a 108 is thereby useful to provide a first opinion (prediction) that model B 112 is able to use to produce a final opinion (prediction). In this manner, model B 112 is able to benefit from the predictions made by model A to produce more accurate predictions with the help of additional data from the output of the previous model. The accuracy of the predictions of model B 112 is verified through the method shown with respect to FIG. 2 below, which is used to produce an accuracy score.

Figure 2:
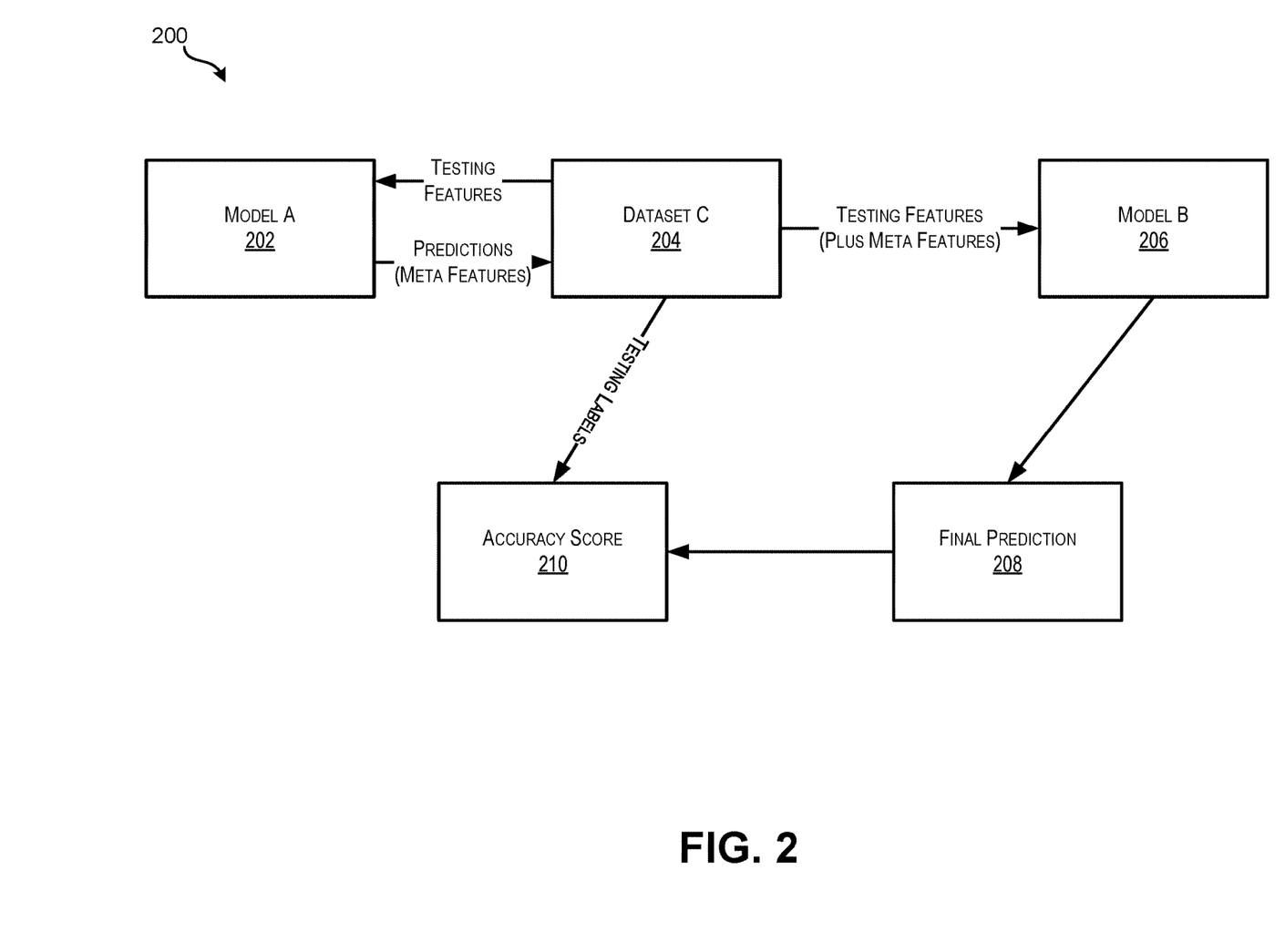
FIG. 2 illustrates a block diagram showing a method for testing and evaluating the model of FIG. 1, according to some embodiments.

FIG. 2 illustrates a block diagram showing a method 200 for testing and evaluating the models of FIG. 1, according to some embodiments. The method 200 is used for generating a final prediction 208 based on the first dataset described above as well as to evaluate the final prediction 208 through the use of an accuracy score 210 that can provide insights into the accuracy of model A 202 and model B 206.

As shown in FIG. 2, model A 202, which may be model A 108 from FIG. 1 or may be any other preliminary trained model, is used with dataset C 202, a third subset of the first dataset, to generate predictions based on the data and the trained model A 202. The predictions generated by model A 202 are added to dataset C 204 and input into model B 206. Model B 206 may be the same as model B 112 of FIG. 1 or may be any other suitable model. The outputs of model B 206 after the data from dataset C 204 (including the predictions output from model A 202) are the final prediction 208. The final prediction 208 may then be compared against labels from dataset C 204 to generate an accuracy score.

As described above with respect to FIG. 1, dataset C 204 includes enough data to generate the final prediction 208 as well as to generate the accuracy score 210. As such, when dividing the first dataset, it is important that dataset C 204 include enough data for testing and evaluation of the models trained using dataset A 102 and dataset B 106. The accuracy score may be presented as a percentage, for example as a percentage of the final predictions 208 that match the testing labels from dataset C 204 or any other indicia of the accuracy of the final prediction 208 with respect to dataset C 204.

Figure 3:
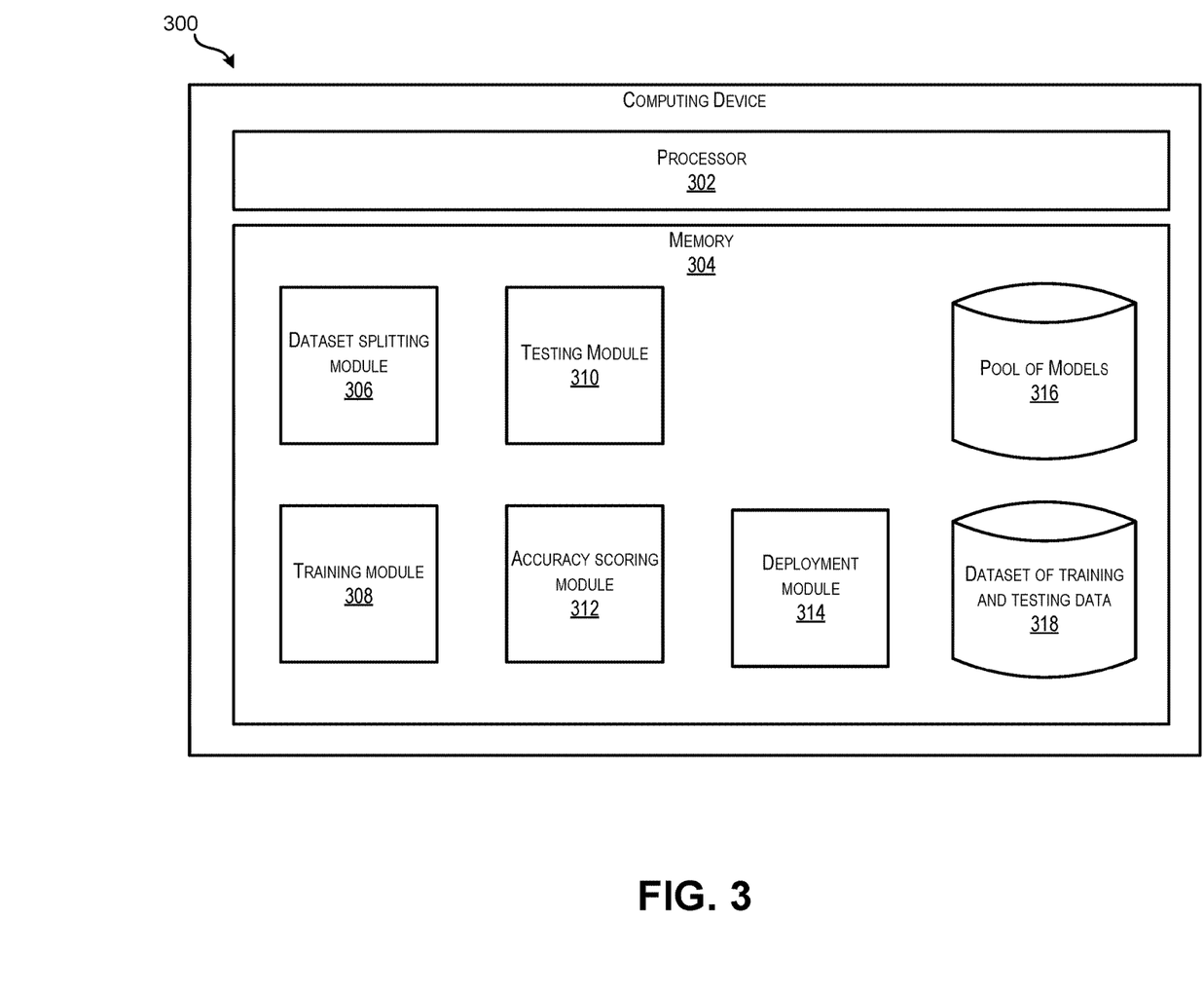
FIG. 3 illustrates an embodiment of a computing device with components for carrying out training and evaluation of the model, according to some embodiments.

FIG. 3 illustrates an embodiment of a computing device 300 with components for carrying out training and evaluation of models, according to some embodiments. The computing device 300 may be any suitable computing device, such as computing device 500 of FIG. 5 or cloud computing system 600 of FIG. 6. The computing device 300 includes a processor 302 and a memory 304. The memory 304 may be a non-transitory memory including instructions for different methods and steps described herein.

In particular, the memory 304 may include a dataset splitting module 306, a training module 308, a testing module 310, an accuracy scoring module 312, a deployment module 314, a pool of models 316, and a dataset of training and testing data 318. In some embodiments, the memory 304 may include multiple different memory devices or partitions. In some embodiments, the modules and elements described with respect to memory 304 may not be stored as independent elements or modules, but may be stored in any suitable configuration.

The dataset splitting module 306 receives data from the dataset of training and testing data 318 and splits the data into subsets of data. The data may include text and non-text data including numerical data and other forms of data capable of processing through a model. The division of the data into the subsets may be random or may be divided according to the contents of the data. For example, a first dataset may correspond to text data while a second dataset is non-text data. A third dataset may include both text and non-text data. In some examples, each of the datasets may include similar data, such as similar types of data for different data entries. The data may be divided into equal sized datasets or may be divided randomly and unequally. The data can be split any number of ways and into as many different parts as can be conceived. In some embodiments, the number of divisions of the data may be a variable that is modifiable by the system to produce more accurate results, for example by tuning the number of divisions of data to ensure each dataset has sufficient data to produce meaningful results without requiring extraneous data for training of the models.

The training module 308 may receive training data from the dataset of training and testing data 318 as well as a model from the pool of models 316 for training based on the training data. The training module may input the data into the model selected from the pool of models 316 to calculate activation values, error terms, and/or weight updates. The training module 308 may also receive data from the dataset splitting module 306 that has been pre-processed to divide data into subsets of data.

The testing module 310 may receive testing data from the dataset of training and testing data 318 and may input the testing data into the models described herein. The testing module 310 may test each of the models to produce predictions, for example as described with respect to FIGS. 1-2 above.

The accuracy scoring module 312 receives data from the dataset of training and testing data as well as data output by the models described herein. For example, the accuracy scoring module 312 may receive the outputs of model B 206 after inputting data from dataset C 204 and may compare against the labels of dataset C 204 to generate an accuracy score.

The deployment module 314 may deploy one or more models of the pool of models 316, for example by deploying the models for training and after training using the data from the dataset of training and testing data 318.

The pool of models 316 includes a number of different models such as probability models and classification models that can be selected for each of the models of the systems described herein. For example, model A 108 may include a classification model while model B 112 is a probability model. In some examples other algorithms and models may be included in the pool of models 316 for selection and use in the systems described herein.

Figure 4:
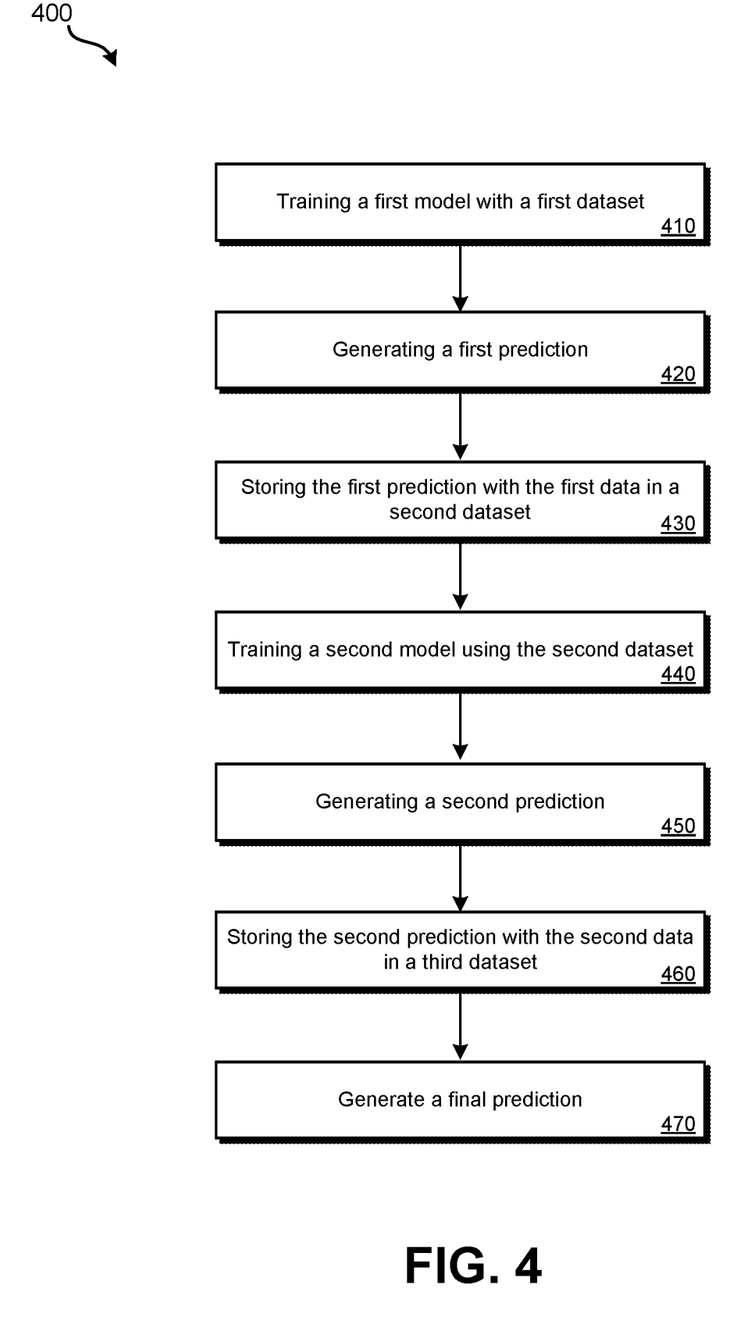
FIG. 4 illustrates an flow diagram illustrating a method for training a model using meta-features from a first model, according to some embodiments.

FIG. 4 illustrates an flow diagram illustrating a method 400 for training a model using meta-features from a first model, according to some embodiments. The method 400 may be performed by, for example, a computing system such as a computing device 300 of FIG. 3, the computing device 500 of FIG. 5, or the cloud computing system 600 of FIG. 6. Though the steps of method 400 are presented in sequential order, some or all of the steps may be performed in different sequences, including simultaneously, in some examples.

At 410, the method 400 includes training a first model with a first dataset. The first dataset may be split from a larger dataset, the larger dataset split into the first dataset, the second dataset, and the third dataset. The larger dataset may be split into additional data sets, such as fourth and fifth datasets as well. The larger dataset may be divided or split as described above. The first model may initially be selected based on an action to be performed. The first model may be trained using the first dataset, for example to classify a data object or provide a probability score or confidence score with respect to an output based on the inputs to the model.

At 420, the method 400 includes generating a first prediction using the first model. The first prediction is generated by inputting the first dataset into the first model. The first model may provide a prediction for each of the first data.

At 430, the method 400 includes storing the first prediction with the first data in a second dataset. The second dataset may include data from the larger dataset as well as the predictions from the first model. The second dataset therefore includes features as well as meta-features. The second dataset may be stored in a memory of a computing device, in a remote storage device, or in any suitable storage device.

At 440, the method 400 includes training a second model using the second dataset. The second model may initially be selected based on an action to be performed. The second model may be trained using the second dataset, for example to classify a data object or provide a probability score or confidence score with respect to an output based on the inputs to the model. The second model is different from the first model in at least one respect. The first model and second model may be entirely different models. In some embodiments, the first model and the second model may have similar structures but differ with respect to parameters of the models.

At 450, the method 400 includes generating a second prediction using the first model. The second prediction is generated by inputting the second dataset into the first model. The first model may provide a prediction for each of the second data.

At 460, the method 400 includes storing the second prediction with the second data in a third dataset. The third dataset may include data from the larger dataset as well as the predictions from the second model. The third dataset therefore includes features as well as meta-features. The third dataset may be stored in a memory of a computing device, in a remote storage device, or in any suitable storage device.

At 470, the method 400 includes generating a final prediction for each item in the third dataset. The final prediction for each item in the third dataset may be generated using the second model, which is previously trained. The final prediction may be evaluated for accuracy by comparing the final prediction against the labels of the third dataset, as described herein.

Figure 5:
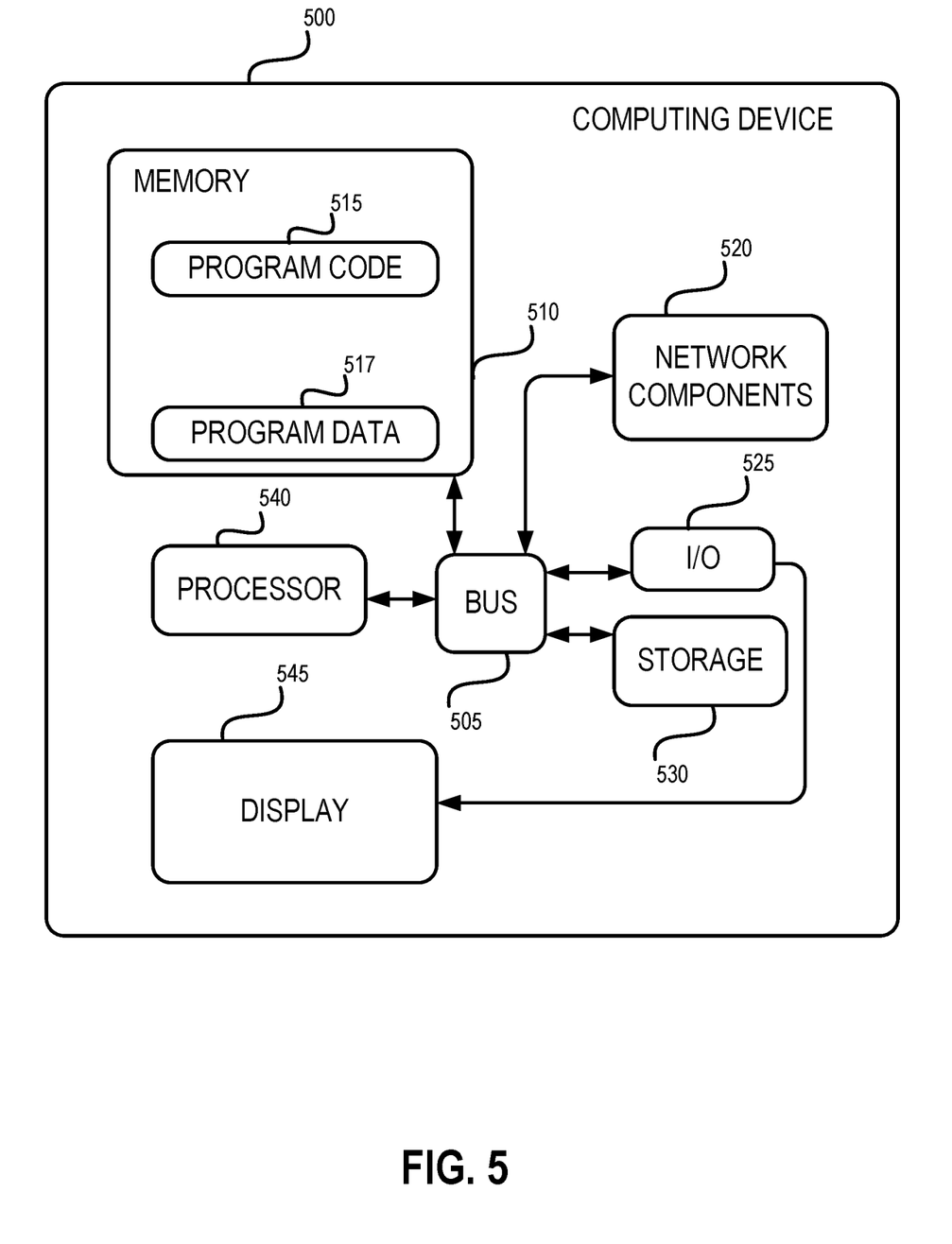
FIG. 5 illustrates a block diagram of a computing system, according to some embodiments.

FIG. 5 illustrates a block diagram of an example of a computing device 500. Computing device 500 can be any of the described computers herein including, for example, computing device 300. The computing device 500 can be or include, for example, an integrated computer, a laptop computer, desktop computer, tablet, server, or other electronic device.

The computing device 500 can include a processor 540 interfaced with other hardware via a bus 505. A memory 510, which can include any suitable tangible (and non-transitory) computer readable medium, such as RAM, ROM, EEPROM, or the like, can embody program components (e.g., program code 515) that configure operation of the computing device 500. Memory 510 can store the program code 515, program data 517, or both. In some examples, the computing device 500 can include input/output ("I/O") interface components 525 (e.g., for interfacing with a display 545, keyboard, mouse, and the like) and additional storage 530.

The computing device 500 executes program code 515 that configures the processor 540 to perform one or more of the operations described herein. Examples of the program code 515 include, in various embodiments logic flowchart described with respect to FIG. 4 above. The program code 515 may be resident in the memory 510 or any suitable computer-readable medium and may be executed by the processor 540 or any other suitable processor.

The computing device 500 may generate or receive program data 517 by virtue of executing the program code 515. For example, sensor data, trip counter, authenticated messages, trip flags, and other data described herein are all examples of program data 517 that may be used by the computing device 500 during execution of the program code 515.

The computing device 500 can include network components 520. Network components 520 can represent one or more of any components that facilitate a network connection. In some examples, the network components 520 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 520 can be wired and can include interfaces such as Ethernet, USB, or IEEE 1394.

Although FIG. 5 depicts a computing device 500 with a processor 540, the system can include any number of computing devices 500 and any number of processor 540. For example, multiple computing devices 500 or multiple processor 540 can be distributed over a wired or wireless network (e.g., a Wide Area Network, Local Area Network, or the Internet). The multiple computing devices 500 or multiple processor 540 can perform any of the steps of the present disclosure individually or in coordination with one another.

Figure 6:
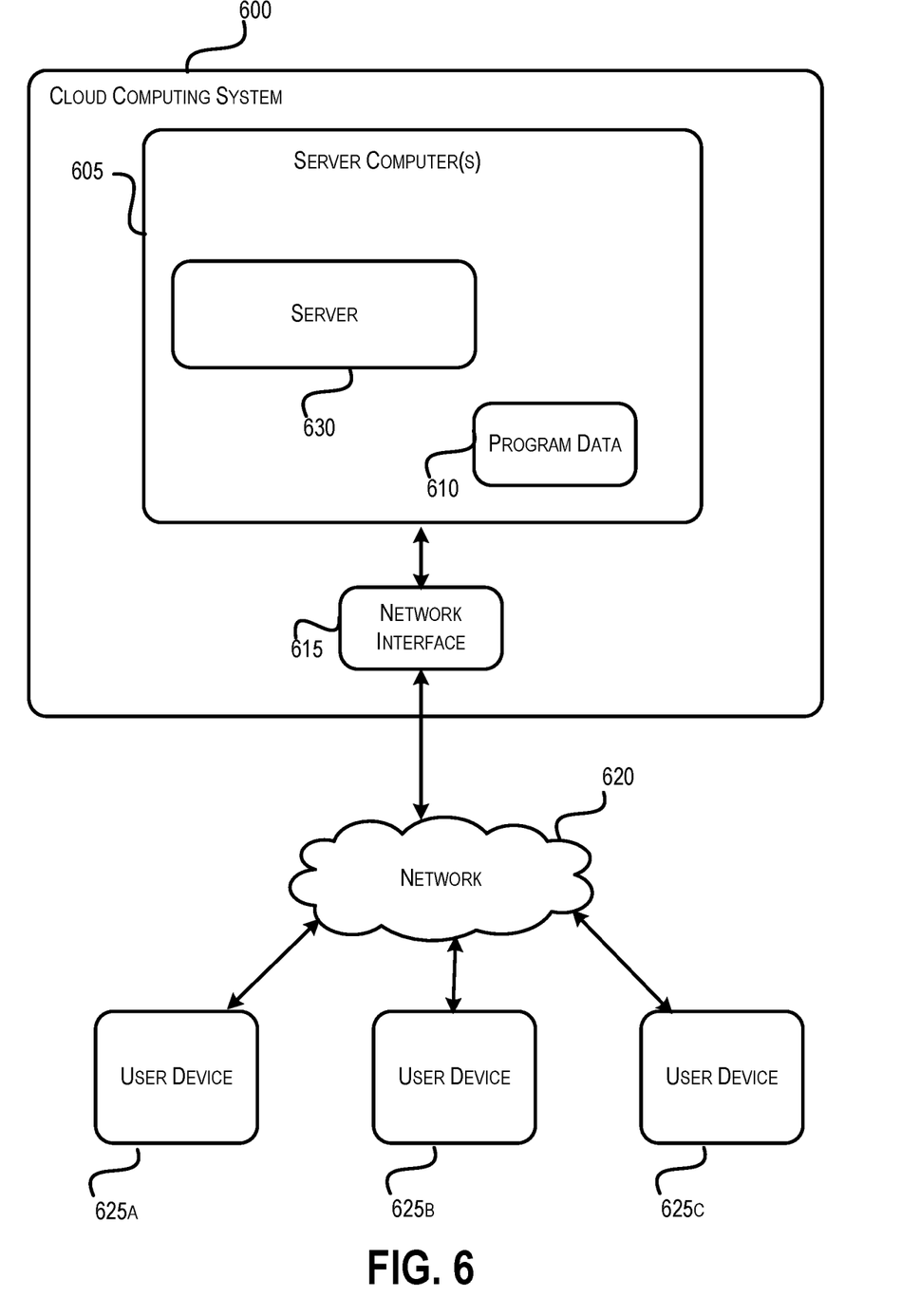
FIG. 6 illustrates a cloud computing system, according to some embodiments.

In some embodiments, the functionality provided by the computing device 500 may be offered as cloud services by a cloud service provider. For example, FIG. 6 depicts an example of a cloud computing system 600 offering an intelligence service that can be used by a number of user subscribers using user devices 625*a*, 625*b*, and 625*c* across a data network 620. User devices 625*a*, 625*b*, and 625*c* could be examples of a computing device 300 described above. In the example, the intelligence service may be offered under a Software as a Service (SaaS) model. One or more users may subscribe to the intelligence service, and the cloud computing system performs the processing to provide the intelligence service to subscribers. The cloud computing system may include one or more remote server computers 605.

The remote server computers 605 include any suitable non-transitory computer-readable medium for storing program code (e.g., server 630) and program data 610, or both, which is used by the cloud computing system 600 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C®, Visual Basic, Java, Python, Perl, JavaScript, and ActionScript. In various examples, the server computers 605 can include volatile memory, non-volatile memory, or a combination thereof.

One or more of the server computers 605 execute the program data 610 that configures one or more processors of the server computers 605 to perform one or more of the operations that determine locations for interactive elements and operate the adaptive rule-based system. As depicted in the embodiment in FIG. 6, the one or more server computers 605 provide the services to perform the adaptive rule-based system via the server 630. Any other suitable systems or subsystems that perform one or more operations described herein (e.g., one or more development systems for configuring an interactive user interface) can also be implemented by the cloud computing system 600.

In certain embodiments, the cloud computing system 600 may implement the services by executing program code and/or using program data 610, which may be resident in a memory device of the server computers 605 or any suitable computer-readable medium and may be executed by the processors of the server computers 605 or any other suitable processor.

In some embodiments, the program data 610 includes one or more datasets and models described herein. Examples of these datasets include dealership data, classification data, etc. In some embodiments, one or more of datasets, models, and functions are stored in the same memory device. In additional or alternative embodiments, one or more of the programs, datasets, models, and functions described herein are stored in different memory devices accessible via the data network 620.

The cloud computing system 600 also includes a network interface device 615 that enable communications to and from cloud computing system 600. In certain embodiments, the network interface device 615 includes any device or group of devices suitable for establishing a wired or wireless data connection to the data networks 620. Non-limiting examples of the network interface device 615 include an Ethernet network adapter, a modem, and/or the like. The server 630 is able to communicate with the user devices 625*a*, 625*b*, and 625*c* via the data network 620 using the network interface device 615.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A method for developing and training a neural network, the method comprising:
    receiving a dataset comprising text data and non-text data;
    determining, based at least in part on the text data and the non-text data, that the dataset is to be split into a first number of datasets;
    splitting the dataset into the first number of datasets that includes at least a first dataset, a second dataset, and a third dataset, the splitting comprising: populating the first dataset only with the text data, populating the second dataset only with the non-text data, and populating the third dataset with a combination of the text data and the non-text data;
    training a first model using the first dataset based on a first set of features;
    generating a first prediction for each of a plurality of first data using the first model and based on the first set of features;
    augmenting the second dataset with the first prediction to obtain an augmented second dataset;
    training a second model using the augmented second dataset based on a second set of features;
    providing the augmented second dataset as input to the first model;
    generating a second prediction for text data of a plurality of second data using the first model based at least in part on receiving the augmented second dataset as input and based at least in part on the second set of features;
    augmenting the third dataset with the second prediction to obtain an augmented third dataset; and
    generating a final prediction for each item in the augmented third dataset using the second model, wherein the augmented third dataset includes the text data of the plurality of second data, the non-text data of the plurality of second data and the second prediction for text data of the plurality of second data using the first model, wherein an accuracy of the final prediction is higher than an accuracy of each of the first prediction and the second prediction, and wherein the accuracy associated with using the first number of datasets is higher than a second accuracy associated with using a different plurality of datasets having a different number of datasets than the first number.

2. The method of claim 1 further comprising splitting a complete dataset into the received dataset, the plurality of first data, and the plurality of second data.

3. The method of claim 2, wherein splitting the complete dataset comprises randomly dividing the complete dataset into equal groupings for the received dataset, the plurality of first data, and the plurality of second data.

4. The method of claim 1, wherein the first model and the second model are different types of models.

5. The method of claim 1, wherein the first model and the second model are a same type of model with different parameters.

6. The method of claim 1, wherein the received dataset, the plurality of first data, and the plurality of second data are each the same size.

7. The method of claim 1, wherein the received dataset is a different size than at least one of the plurality of first data or the plurality of second data.

8. A non-transitory computer-readable medium having instructions stored thereon that, when executed by one or more processors, cause the one or more processors to:
    receive a dataset comprising text data and non-text data;
    determine, based at least in part on the text data and the non-text data, that the dataset is to be split into a first number of datasets;
    split the dataset into the first number of datasets that includes at least a first dataset, a second dataset, and a third dataset, the splitting comprising: populating the first dataset only with the text data, populating the second dataset only with the non-text data, and populating the third dataset with a combination of the text data and the non-text data;
    train a first model using the first dataset based on a first set of features;
    generate a first prediction for each of a plurality of first data using the first model and based on the first set of features;
    augment the second dataset with the first prediction to obtain an augmented second dataset;

train a second model using the augmented second dataset based on a second set of features;
provide the augmented second dataset as input to the first model;
generate a second prediction for text data of a plurality of second data using the first model based at least in part on receiving the augmented second dataset as input and based at least in part on the second set of features;
augment the third dataset with the second prediction to obtain an augmented third dataset; and
generate a final prediction for each item in the augmented third dataset using the second model, wherein the augmented third dataset includes the text data of the plurality of second data, the non-text data of the plurality of second data and the second prediction for text data of the plurality of second data using the first model, wherein an accuracy of the final prediction is higher than an accuracy of each of the first prediction and the second prediction, and wherein the accuracy associated with using the first number of datasets is higher than a second accuracy associated with using a different plurality of datasets having a different number of datasets than the first number.

9. The non-transitory computer-readable medium of claim 8, further comprising additional instructions that, when executed by the one or more processors, cause the one or more processors to:
split a complete dataset into the received dataset, the plurality of first data, and the plurality of second data.

10. The non-transitory computer-readable medium of claim 9, wherein splitting the complete dataset comprises randomly dividing the complete dataset into equal groupings for the received dataset, the plurality of first data, and the plurality of second data.

11. The non-transitory computer-readable medium of claim 8, wherein the first model and the second model are different types of models.

12. The non-transitory computer-readable medium of claim 8, wherein the first model and the second model are a same type of model with different parameters.

13. The non-transitory computer-readable medium of claim 8, wherein the received dataset, the plurality of first data, and the plurality of second data are each the same size.

14. The non-transitory computer-readable medium of claim 8, wherein the received dataset is a different size than at least one of the plurality of first data or the plurality of second data.

15. A system comprising:
a processor; and
a non-transitory computer-readable medium having instructions stored thereon that, when executed by the processor, cause the processor to:
receive a dataset comprising text data and non-text data;
determine, based at least in part on the text data and the non-text data, that the dataset is to be split into a first number of datasets;
split the dataset into the first number of datasets that includes at least a first dataset, a second dataset, and a third dataset, the splitting comprising: populating the first dataset only with the text data, populating the second dataset only with the non-text data, and populating the third dataset with a combination of the text data and the non-text data;
train a first model using the first dataset based on a first set of features;
generate a first prediction for each of a plurality of first data using the first model and based on the first set of features;
augment the second dataset with the first prediction to obtain an augmented second dataset;
train a second model using the augmented second dataset based on a second set of features;
provide the augmented second dataset as input to the first model;
generate a second prediction for text data of a plurality of second data using the first model based at least in part on receiving the augmented second dataset as input and based at least in part on the second set of features;
augment the third dataset with the second prediction to obtain an augmented third dataset; and
generate a final prediction for each item in the augmented third dataset using the second model, wherein the augmented third dataset includes the text data of the plurality of second data, the non-text data of the plurality of second data and the second prediction for text data of the plurality of second data using the first model, wherein an accuracy of the final prediction is higher than an accuracy of each of the first prediction and the second prediction, and wherein the accuracy associated with using the first number of datasets is higher than a second accuracy associated with using a different plurality of datasets having a different number of datasets than the first number.

16. The system of claim 15, wherein the computer-readable medium comprises further instructions that, when executed by the one or more processors, cause the one or more processors to:
split a complete dataset into the received dataset, the plurality of first data, and the plurality of second data.

17. The system of claim 16, wherein splitting the complete dataset comprises randomly dividing the complete dataset into equal groupings for the received dataset, the plurality of first data, and the plurality of second data.

18. The system of claim 15, wherein the first model and the second model are different types of models.

19. The system of claim 15, wherein the received dataset is a different size than at least one of the plurality of first data or the plurality of second data.

20. The system of claim 15, wherein the first model and the second model are a same type of model with different parameters.

* * * * *